(12) United States Patent
Kamiya et al.

(10) Patent No.: US 8,177,043 B2
(45) Date of Patent: May 15, 2012

(54) STEERING DAMPING METHOD FOR VEHICLE AND STEERING DAMPING DEVICE FOR VEHICLE

(75) Inventors: Noboru Kamiya, Shizuoka-ken (JP); Fujio Matsui, Shizuoka-ken (JP)

(73) Assignee: Yamaha Motor Hydraulic System Co., Ltd., Shizuoka (JP)

( * ) Notice: Subject to any disclaimer, the term of this patent is extended or adjusted under 35 U.S.C. 154(b) by 986 days.

(21) Appl. No.: 12/167,160

(22) Filed: Jul. 2, 2008

(65) Prior Publication Data
US 2009/0008197 A1    Jan. 8, 2009

(30) Foreign Application Priority Data
Jul. 2, 2007    (JP) ................................. 2007-174468

(51) Int. Cl.
*F16F 9/54* (2006.01)

(52) U.S. Cl. ............... 188/322.2; 188/266.4; 188/266.5; 188/282.3; 188/297; 188/306; 188/310; 188/313; 188/322.13; 188/322.15; 188/322.19; 280/90; 280/272; 280/276; 280/771; 701/37; 701/40; 701/42

(58) Field of Classification Search ................ 188/297, 188/322.2; 280/90, 271, 272; 701/41–42; F16F 9/14, 9/34, 9/50; B62K 21/08; B62D 7/20
See application file for complete search history.

(56) References Cited

U.S. PATENT DOCUMENTS

2005/0151341 A1* 7/2005 Iwamoto et al. ............. 280/272
2005/0173911 A1* 8/2005 Takeuchi et al. ............. 280/771

FOREIGN PATENT DOCUMENTS

| JP | 2001301682 A | * 10/2001 |
| JP | 2003-237672 | 8/2003 |
| JP | 2004-026092 | 1/2004 |

* cited by examiner

*Primary Examiner* — Robert A Siconolfi
*Assistant Examiner* — San Aung
(74) *Attorney, Agent, or Firm* — Keating & Bennett, LLP

(57) ABSTRACT

A steering damper can generate a smaller damping force according to a first damping force characteristic or a larger damping force according to a second damping force characteristic by controlling a flow of hydraulic oil during a steering operation of a steering member. When the associated vehicle is running at a relatively low or medium speed and is not accelerating, and if an operational speed of the steering damper is lower than a predetermined value, damping force according to the first damping force characteristic can be generated in the steering damper. On the other hand, when the operational speed of the steering damper is equal to or higher than the predetermined value, damping force according to the second damping force characteristic can be generated in the steering damper. While the vehicle is running at a high speed or is accelerating, the damping force according to the second damping force characteristic can be generated in the steering damper regardless of the operational speed of the steering damper.

4 Claims, 7 Drawing Sheets

STEERING DAMPING METHOD FOR VEHICLE AND STEERING DAMPING DEVICE FOR VEHICLE

CROSS-REFERENCE TO RELATED APPLICATIONS

This application is based upon and claims priority under 35 U.S.C. §119 to Japanese patent application Serial No. 2007-174468, filed Jul. 2, 2007, the entire contents of which is hereby incorporated by reference.

BACKGROUND OF THE INVENTIONS

1. Field of the Inventions

The present application relates to steering damping methods and devices for a vehicle in which impact force applied to a steering member is damped by damping force generated cooperatively with a steering operation of the steering member as well as methods and systems in which strength of the damping force is varied according to a running state of the vehicle.

2. Description of the Related Art

Japanese Patent Documents JP-A-2003-237672 and JP-A-2004-26092 disclose conventional steering damping devices which dampen the impact force applied to a steering member from a road surface to improve driving stability of a vehicle.

These patents disclose a steering damper which performs an expansion operation and a contraction operation cooperatively with a steering operation of the steering member and use hydraulic oil flow to generate the damping forces. These documents also further disclose a bypass oil passage mutually connecting two oil chambers defined by a piston in a cylinder of the steering damper. They additionally disclose a ball disposed in a middle part of the bypass oil passage configured to open and close the bypass oil passage.

When the steering damper is operated cooperatively with the steering operation of the steering member, the hydraulic oil flows through the bypass oil passage from one side of the two oil chambers to the other side thereof. In addition, the ball mechanically opens or closes the bypass oil passage according to the strength of external force applied to the ball from the hydraulic oil.

With reference to FIG. 5, when the ball opens the bypass oil passage, the hydraulic oil freely flows through the bypass oil passage. Therefore, on this occasion, the steering damper has a damping force characteristic 1 in which relatively small, first damping force is generated. On the other hand, when the ball closes the bypass oil passage, the hydraulic oil is restrained from flowing through the bypass oil passage. Therefore, on this occasion, the steering damper has a damping force characteristic 2 in which a larger, second damping force is generated.

While the vehicle is running, and when the road surface is generally flat, the impact force applied to the steering member from the road surface is relatively small in general. Therefore, the steering operation of the steering member is relatively slow. Consequently, driving stability is kept excellent. Further, on this occasion, an operational speed of the steering damper cooperating with the steering member is lower than a predetermined value. Therefore, the external force applied to the ball from the hydraulic oil flowing through the bypass oil passage is relatively small. Accordingly, the ball keeps the bypass oil passage open. In this manner, the steering damper generates damping force according to the damping force characteristic 1 of the steering damper.

Consequently, as described above, when the road surface is generally flat, driving stability is kept excellent, and a steering operation by a rider in relation to the steering member is not intensely affected by the damping force of the steering damper, and can be performed lightly and smoothly. Therefore, ride comfort of the vehicle is also kept excellent.

On the other hand, when the road surface is rough with more unevenness, the impact force applied to the steering member from the road surface is relatively large. Therefore, the steering operation of the steering member by the impact force is faster than when the road surface is generally flat. Consequently, the operational speed of the steering damper cooperating with the steering member becomes equal to or higher than the predetermined value. Therefore, the external force applied to the ball from the hydraulic oil flowing through the bypass oil passage becomes larger than when the road surface is generally flat. Accordingly, the ball mechanically closes the bypass oil passage with the external force. In this manner, the steering damper generates damping force according to the damping force characteristic 2 of the steering damper.

Consequently, as described above, when the road surface is rough, the impact force applied to the steering member is damped by the larger damping force. Accordingly, a faster steering operation is regulated, and driving stability is kept excellent.

SUMMARY OF THE INVENTIONS

An aspect of at least one of the embodiments disclosed herein includes the realization that when a vehicle is running at a high speed or is accelerating, the steering member can tend to perform the steering operation (e.g. turning of the handlebars) relatively faster because of the impact force applied to the steering member from the road surface. If the road surface is generally flat, the steering member can tend to perform the steering operation with very small strokes. Consequently, the steering damper cooperating with the steering member also can tend to perform its operation relatively fast and with very small strokes. Accordingly, the flow speed of the hydraulic oil flowing through the bypass oil passage of the steering damper can become relatively fast. However, since the stroke of the operation of the steering damper is relatively small, an absolute amount of each stroke of the hydraulic oil flowing through the bypass oil passage is relatively small. Therefore, because the energy applied to the ball from the hydraulic oil remains relatively small, the ball does not sufficiently react to the external force from the hydraulic oil, and an opening of the bypass oil passage is kept opened. This can result in deterioration of driving stability as well as ride comfort. Therefore, it is desired to have a steering damping method and steering damper which maintain driving stability and ride comfort in response to various running states in which conditions of the road surface, running speed, and acceleration vary.

Thus, in accordance with an embodiment, a steering damping method can be provided for a vehicle in which impact force applied to a steering member is damped by damping force. The method can comprise providing a steering damper which performs an expansion operation or a contraction operation cooperatively with a steering operation of the steering member and makes hydraulic oil flow to generate first damping force according to a first damping force characteristic and to generate a second, larger damping force according to a second damping force characteristic. The method can also include determining if the operational speed of the steering damper is equal to or higher than the predetermined value and determining if the vehicle is running below a predetermined speed and is not accelerating. Additionally, the method can include generating the first damping force according to the first damping force characteristic if an operational speed of the steering damper is smaller than a predetermined value and generating the second damping force according to the second damping force characteristic if the operational speed of the steering damper is equal to or higher than the predetermined value while the vehicle is running below a predetermined speed and is not accelerating. The second damping force according to the second damping force characteristic can be generated by the steering damper regardless of the operational speed of the steering damper while the vehicle is running at or above the predetermined speed or is accelerating.

In accordance with another embodiment, a steering damper device can be provided for a vehicle which performs an expansion operation or a contraction operation cooperatively with a steering operation of a steering member and makes hydraulic oil flow to generate damping force. The damper device can comprise a bypass oil passage mutually connecting first and second oil chambers defined by a piston in a cylinder tube. First and second damping force generators can be provided in series in a middle part of the bypass oil passage for regulating a flow of the hydraulic oil in the bypass oil passage. The first damping force generator can be formed in the middle part of the bypass oil passage and comprises a large diameter chamber having a diameter size larger than that of the bypass oil passage and a movable body contained in the large diameter chamber for opening and closing the middle part of the bypass oil passage with external force from the hydraulic oil flowing in the large diameter chamber. The second damping force generator can comprise a control valve for opening or closing the middle part of the bypass oil passage. The control valve can be configured to open the bypass oil passage when the vehicle is running below a predetermined speed and is not accelerating. Additionally, the control valve can be configured to close the bypass oil passage when the vehicle is running at or above the predetermined speed or is accelerating.

A steering damper device can be configured to dampen the impact force applied to a steering member of a motorcycle. The steering damper can comprise a cylindrical tube comprising first and second oil chambers and a piston, the piston separating the first oil chamber from the second oil chamber. A bypass oil passage can fluidly connect the first oil chamber to the second oil chamber, a portion of the bypass oil passage comprising a damping chamber larger in diameter than the diameter of the bypass oil passage on either side of the damping chamber. A movable body can be disposed within the damping chamber and can be configured to open and close the bypass oil passage based on hydraulic oil pressure in the damping chamber. A control valve system can be configured to open and close the bypass oil passage depending upon the speed and acceleration characteristics of the vehicle. The control valve system can be configured to open the bypass oil passage when the vehicle is both running at a speed less than a predetermined value and not accelerating. The control valve system can also be configured to close the bypass oil passage when the vehicle is running at a speed equal to or greater than the predetermined value. Additionally, the control valve system can be configured to close the bypass oil passage when the vehicle is accelerating.

BRIEF DESCRIPTION OF THE DRAWINGS

These and other features, aspects and advantages of the present inventions are described below in connection with preferred embodiments, in reference to the accompanying drawings. The illustrated embodiments, however, are merely examples and are not intended to limit the inventions. The drawings include the following 7 figures.

DETAILED DESCRIPTION OF THE PREFERRED EMBODIMENT

Figure 1:
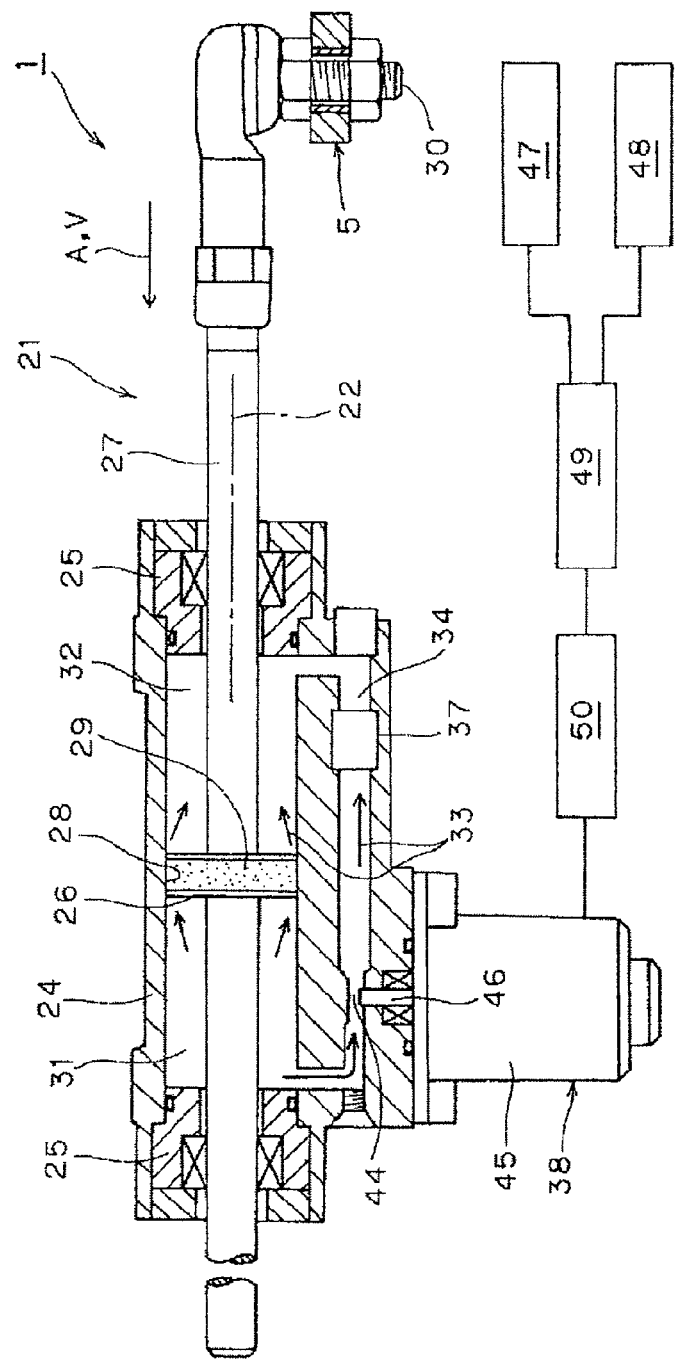
FIG. 1 is a cross-sectional view of an embodiment of a steering damping device taken along an arrow I-I in FIG. 2.
Figure 2:
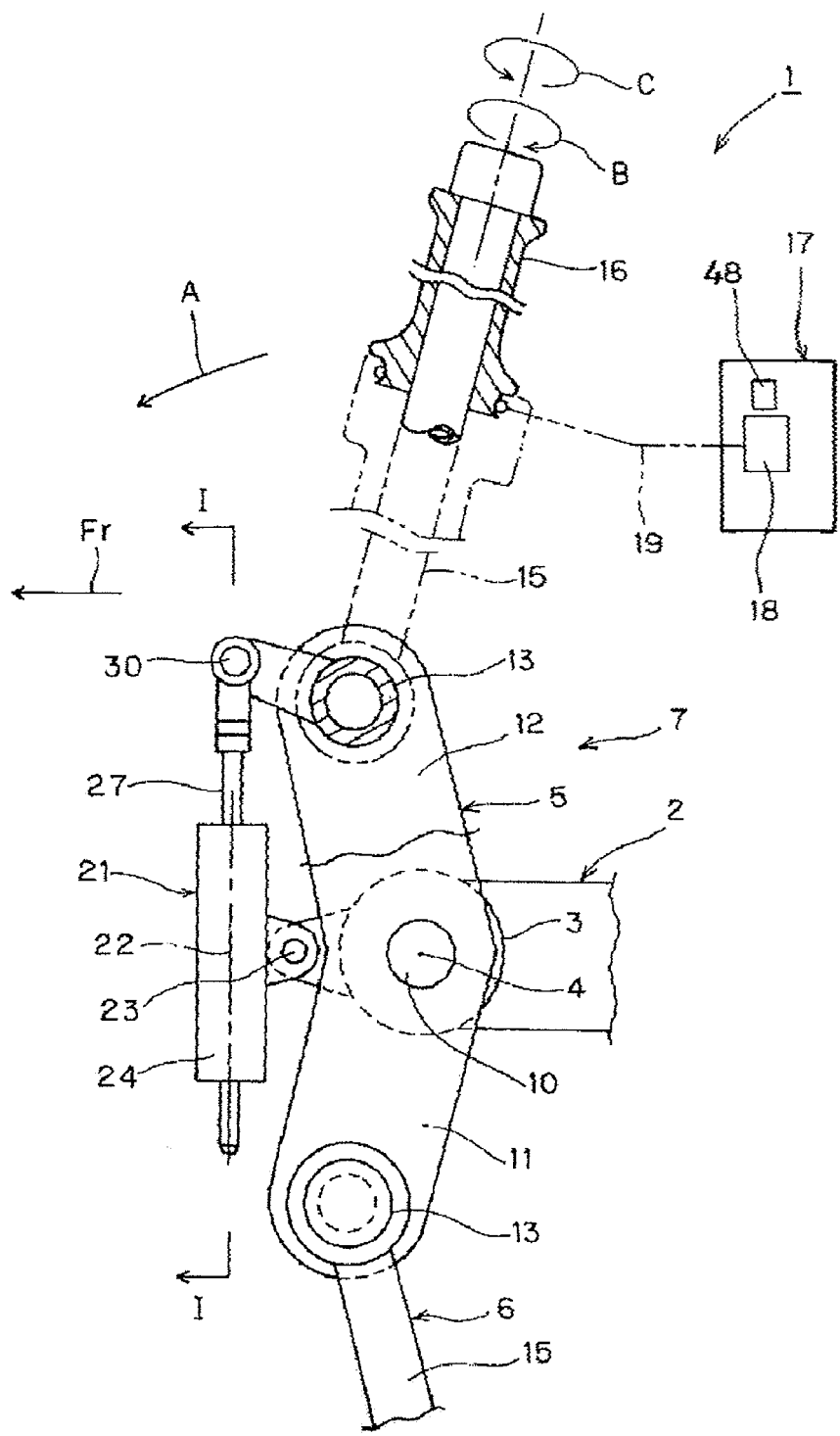
FIG. 2 is a cross-sectional view of a front of a vehicle, including the embodiment of a steering damping device in FIG. 1.

FIGS. 1-4 illustrate a straddle-type vehicle 1. The vehicle 1 is illustrated as a motorcycle, with an arrow Fr (FIG. 2) indicating the forward direction in which the vehicle 1 runs. The various embodiments of the steering damping device are disclosed in the context of a motorcycle because it has particular utility in this context. However, the steering damping devices disclosed herein can be used in other contexts, such as, for example, but without limitation, trucks, automobiles, or any other vehicle or device that requires a steering mechanism.

With reference to FIGS. 1-4, the vehicle 1 can include a body frame 2 and a front fork 5 supported in a manner in which a steering operation (rotation) A is enabled around an axial center 4 of a head pipe 3. The head pipe 3 can constitute a front upper end of the body frame 2. The vehicle 1 can also include a front wheel (not shown) supported on a lower end of the front fork 5, and a handlebar 6 in a shape of a bar supported on an upper end of the front fork 5. The front fork 5, the front wheel, and the handlebar 6 can constitute a steering member 7 of the vehicle 1.

The front fork 5 can include a steering shaft 10 fitted in the head pipe 3 and supported such that the front fork 5 can be pivoted in the direction of arrow A, around the axial center 4 of the fitting 10. The front fork 5 can also include upper and lower brackets 11 and 12 supported on upper and lower ends of the steering shaft 10, and a pair of left and right fork tubes 13 whose upper ends are supported by the upper and the lower brackets 11 and 12, and whose lower ends support the front wheel.

The handlebar 6 can be supported on the upper bracket 11. The handlebar 6 can include a pair of left and right handlebar main bodies 15 projecting toward a rear lower direction respectively from left and right ends of the upper bracket 11 and a pair of left and right grips 16 supported on each projecting end of the handlebar main bodies 15. Of the two grips 16, the right grip 16 can be supported on the projecting end of the handlebar main body 15 in a manner in which forward and backward rotations B and C are enabled. A spring not shown can be provided to cause a bias so that the grip 16 performs the backward rotation C.

A throttle valve 18 of an engine 17 as a drive power source of the vehicle 1 can be supported on the body frame 2 and cooperatively connected to the right grip 16 via a wire 19.

When the grip 16 is rotated forwardly B in resistance to the spring, the throttle valve 18 can cooperate with the forward rotation B via the wire 19, and the valve can be opened. Accordingly, the power output of the engine 17 can be increased, and the vehicle 1 can be accelerated. When the grip 16 is rotated backward C by the spring, the power output of the engine 17 can be reduced, and the vehicle 1 decelerated.

A steering damper 21 of a hydraulic pressure type which generates damping force cooperatively with the steering operation A of the steering member 7 can be provided. The steering damper 21 can include a cylinder tube 24 having an axial center 22 extending in the width direction of the vehicle 1 in a vicinity of the front of the head pipe 3 and pivotally supported on the head pipe 3 via a supporting member 23. The steering damper 21 can also include a cover 25 for closing an opening on each end in the axial direction of the cylinder tube 24, a piston 26 slidably fitted in the cylinder tube 24 in the axial direction, a piston rod 27 positioned coaxially with the axial center 22 of the cylinder tube 24 and mutually connected to the piston 26, and a seal body 29 which is attached on an outer circumference of the piston 26 and elastically closes a space 28 between an inner circumference of the cylinder tube 24 and the outer circumference of the piston 26.

Each end of the piston rod 27 can slidably pass through each of the covers 25 in the axial direction. One end of the piston rod 27 can be pivotally supported on one side of the front fork 5 via a supporting member 30. The inside of the cylinder tube 24 can be defined into first and second oil chambers 31 and 32 by the piston 26, and hydraulic oil 33 can be filled in these chambers.

A bypass oil passage 34 can extend horizontally to mutually connect the first and the second oil chambers 31 and 32 and enable the hydraulic oil 33 to flow in the cylinder tube 24. First and second damping force generators 37, 38 for regulating the flow of the hydraulic oil 33 in the bypass oil passage 34 can be provided in series in a middle part of the bypass oil passage 34.

Figure 3:
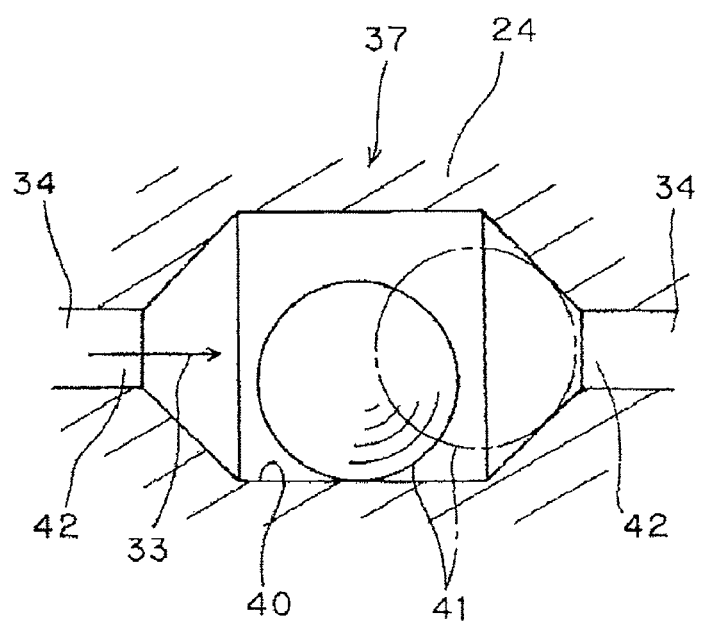
FIG. 3 is an enlarged view of a portion of the embodiment in FIG. 1.

With reference to FIG. 3, the first damping force generator 37 can include a large diameter chamber 40 formed coaxially with the middle part of the bypass oil passage 34 and having a diameter larger than that of the bypass oil passage 34. The first damping force generator can include a movable body 41 such as a ball contained freely in the large diameter chamber 40. Each end in the axial direction of the large diameter chamber 40 can be in a shape of a truncated cone whose diameter becomes smaller toward the outside ends in the axial direction.

An end 42 of the bypass oil passage 34 can open at each end of the chamber 40. When the movable body 41 is in a free state, the movable body 41 can open the end 42 of the bypass oil passage 34. The movable body 41 can be moved by external force from the hydraulic oil 33 flowing in the large diameter chamber 40 to open or close the end 42 of the bypass oil passage 34.

Figure 4:
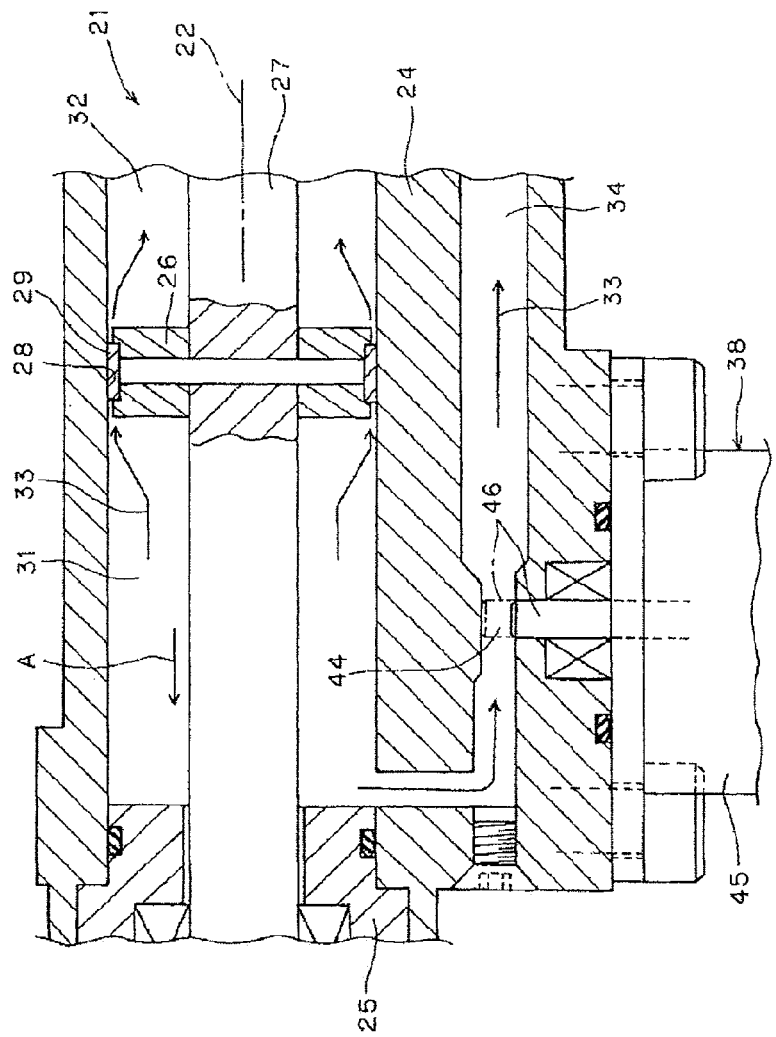
FIG. 4 is an enlarged view of a portion of the embodiment in FIG. 1.

On the other hand, and with reference to FIG. 4, the second damping force generator 38 can include a control valve 45 of a solenoid type for opening or closing an orifice 44 formed in the middle part of the bypass oil passage 34. The control valve 45 can be supported on the cylinder tube 24, and a valve element 46 of the control valve 45 provided to open or close the orifice 44.

With reference to FIG. 1, a vehicle speed sensor 47 can be configured to detect running speed (km/h) of the vehicle 1, an accelerator operation amount sensor 48 can be configured to detect an accelerator operation amount θ as an amount of rotation of the grip 16 operated for driving and operating the vehicle 1, a control device 49 to which detection signals from the sensors 47 and 48 and the like are input, can be configured to electronically control the engine 17, and a driving circuit 50 can be configured to connect the control valve 45 to the control device 49, can also be provided.

The vehicle speed sensor 47 can be configured to detect the rotational speed of the wheel to more directly detect running speed. The vehicle speed sensor 47 can detect the rotational speed of a rotating body in the engine 17 or in a transmission and detect a shift change state (gear position) to indirectly detect running speed.

The accelerator operation amount sensor 48 can be configured to detect the accelerator operation amount θ on the basis of the forward rotation B from an initial rotational position of the grip 16 and a throttle opening from a fully closed state of the throttle valve 18.

With reference to FIGS. 1-5, solid lines illustrate a state in which the bypass oil passage 34 is opened as the movable body 41 of the first damping force generator 37 separates away from the end 42 of the bypass oil passage 34, and a state in which the orifice 44 is opened as the control valve 45 of the second damping force generator 38 opens the valve.

The steering member 7 can be rotated in the direction of arrow A, as noted above. Accordingly, the steering damper 21 can perform expansion and contraction operations. In other words, the piston 26 can be moved in relation to the cylinder tube 24 cooperatively with the steering operation A of the steering member 7 via the supporting member 30 and the piston rod 27. Accordingly, the hydraulic oil 33 of the first oil chamber 31 can be pressurized by the relative movement. As a sectional area of the space 28 can be extremely small, only a relatively small portion of the hydraulic oil 33 in the first oil chamber 31 flows through the space 28 toward the second oil chamber 32. Most of the hydraulic oil 33 in the first oil chamber 31 can flow through the bypass oil passage 34 toward the second oil chamber 32.

Figure 5:
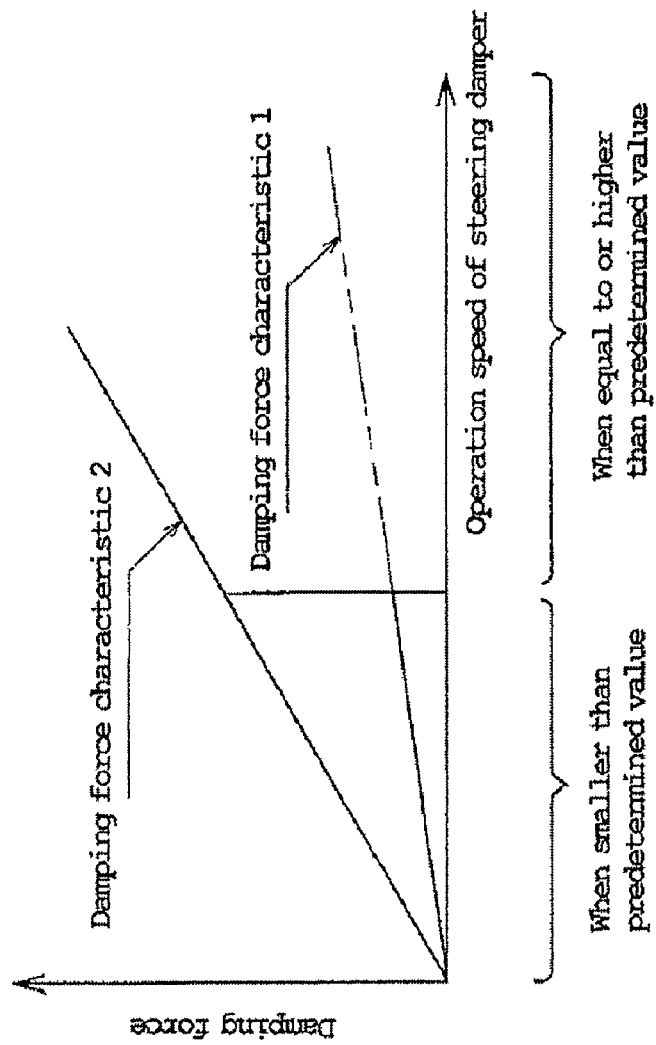
FIG. 5 is a graph illustrating a damping force characteristic 1 and a damping force characteristic 2 of the embodiment in FIG. 1.

As a result, the damping force characteristic 1 in which the damping force is relatively small can be obtained in the steering damper 21 by flow of the hydraulic oil 33 (see FIG. 5). According to the damping force characteristic 1, the steering operation A of the steering member 7 is not regulated excessively by the damping force, and therefore the steering operation A of the steering member 7 by the rider can be performed more lightly and smoothly.

On the other hand, as indicated by alternate long and short dash lines in FIGS. 3 and 4, the steering member 7 can also be rotated in the direction of arrow A in the state in which the end 42 of the bypass oil passage 34 is closed by the movable body 41 of the first damping force generator 37, and the state in which the orifice 44 is closed by an operation for closing the valve of the control valve 45 of the second damping force generator 38. Accordingly, the piston 26 can be moved in relation to the cylinder tube 24 cooperatively with the steering operation A via the supporting member 30 and the piston rod 27 in a manner similar to the case described above. Consequently, the hydraulic oil 33 of the first oil chamber 31 can be pressurized by the relative movement. As a result, the hydraulic oil 33 in the first oil chamber 31 can flow generally only through the space 28 toward the second oil chamber 32.

Therefore, the damping force characteristic 2 in which the damping force is larger than damping force characteristic 1 is obtained in the steering damper 21 by the flow of the hydraulic oil 33 through the space 28 (see FIG. 5). According to the damping force characteristic 2, the steering operation A of the steering member 7 can generally be more regulated by the damping force than by damping characteristic 1, and therefore the steering operation A can be heavier and slower.

Figure 6:
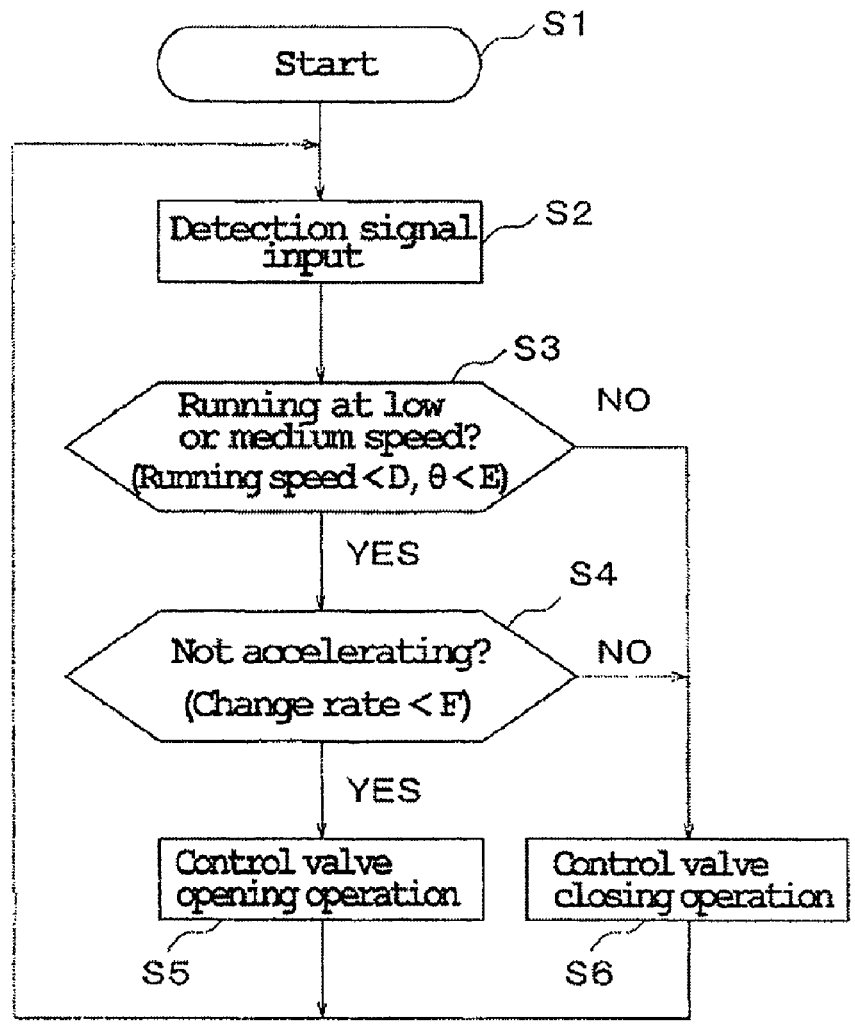
FIG. 6 is a flow chart illustrating the control processes performed by a control device of the embodiment in FIG. 1.

FIG. 6 illustrates a flow chart of control of the steering damper 21 by the control device 49. In the drawing, S indicates each step of a program.

In step S2, each detection signal can be input from the sensors 47 and 48 to the control device 49 while the vehicle 1 is running. Following this, in step S3, if the running speed (km/h) as detected by the detection signal of the vehicle speed sensor 47 is less than a predetermined value D or if the accelerator operation amount θ as detected by the detection signal of the accelerator operation amount sensor 48 is less than a predetermined value E, then it can be determined that the vehicle 1 is running at a relatively low or medium speed. Accordingly, step S4 can be executed.

In step S4, if the change rate (dθ/dt) of the accelerator operation amount θ is less than a predetermined value F, it can be determined that the vehicle 1 is not accelerating. Accordingly, step S5 can be executed.

In step S5, the control valve 45 can open the valve, and the orifice 44 in the bypass oil passage 34 can be opened.

While the bypass oil passage 34 is opened, and when the road surface on which the vehicle 1 is running is generally flat, impact force applied to the steering member 7 from the road surface can be relatively small. In this case, the steering operation A of the steering member 7 by the impact force can be relatively slow. Consequently, driving stability can remain excellent.

Further, on this occasion, an operational speed V of the steering damper 21 cooperating with the steering member 7 can be lower than the predetermined value. Therefore, the external force applied to the movable body 41 from the hydraulic oil 33 flowing in the bypass oil passage 34 of the steering damper 21 can be relatively small. Accordingly, the movable body 41 can mechanically keep the end 42 of the bypass oil passage 34 of the large diameter chamber 40 open, and the steering damper 21 can be set to the damping force characteristic 1 in which the damping force is relatively small.

In other words, while the vehicle 1 is running at a relatively low or medium speed and is not accelerating, and when the impact force applied to the steering member 7 is relatively small (such as when the road surface is generally flat), the steering damper 21 can be set to the damping force characteristic 1. Consequently, when the road surface is generally flat as described above, driving stability can remain excellent and the steering operation can be performed lightly and smoothly. Therefore, ride comfort of the vehicle 1 can remain excellent.

Further, since the damping force can be made relatively small as described above, the steering operation A of the steering member 7 of the vehicle 1 performed by a rider while the vehicle is relatively frequently running at a low or medium speed and is not accelerating, and the steering operation A during handling performed while the vehicle is running at a low speed and not accelerating, can be prevented from being intensely regulated by the damping force. Consequently, the steering operation A of the steering member 7 and handling by the rider can be performed lightly and smoothly while the vehicle 1 is running at a relatively low or medium speed and not accelerating. Thus, ride comfort of the vehicle 1 can remain excellent.

Further, in step S5, even though the vehicle is running at a relatively low or medium speed and not accelerating, when the bypass oil passage 34 is opened by the operation for opening the valve of the control valve 45, if the impact force applied to the steering member 7 from the road surface is large (such as when the road surface is rough with large unevenness), then the steering operation A of the steering member 7 by the impact force can become faster. Consequently, the operational speed V of the steering damper 21 cooperating with the steering member 7 can become equal to or higher than the predetermined value.

In this case, the movable body 41 can mechanically close the bypass oil passage 34 of the large diameter chamber 40 by the external force applied from the hydraulic oil 33 flowing in the bypass oil passage 34 of the steering damper 21. As a result, the steering damper 21 can be set to the damping force characteristic 2 in which the damping force is larger. In other words, even when the vehicle 1 is running at a relatively low or medium speed and is not accelerating, if the impact force applied to the steering member 7 is large enough, such as in a case where the road surface is rough with large unevenness, then the damping force characteristic 2 of the steering damper 21 can be obtained.

Consequently, the impact force applied to the steering member 7 can be efficiently damped by the larger damping force. Accordingly, the relatively faster steering operation A of the steering member 7 can be regulated. In other words, even when the road surface is rough with large unevenness, driving stability can remain excellent.

On the other hand, in step S3, if the running speed is equal to or higher than the predetermined value D, and if the accelerator operation amount θ is equal to or larger than the predetermined value E, it can be determined that the vehicle 1 is running at a relatively high speed. Accordingly, step S6 can be executed. Further, in step S4, if the change rate of the accelerator operation amount θ is equal to or larger than the predetermined value F, it can be determined that the vehicle 1 is accelerating. Accordingly, the step S6 can be executed.

In step S6, the control valve 45 can close the valve, and the orifice 44 in the bypass oil passage 34 can be closed. Therefore, the damping force characteristic 2 of the steering damper 21 in which the damping force is larger can be obtained.

While the vehicle is running at a high speed or is accelerating, the impact force applied to the steering member 7 from the road surface can be relatively large in general. However, the impact force can be efficiently damped by the larger damping force. Accordingly, driving stability is kept excellent.

Moreover, while the vehicle is running at a high speed or is accelerating, if the road surface is generally flat, then the impact force applied to the steering member 7 can be efficiently damped by the larger damping force as described above. This can be true even in a case where the steering member 7 keeps performing the relatively faster steering operation A with very small strokes because of the impact force applied to the steering member 7 from the road surface. Consequently, the faster steering operation A with very small strokes described above can be regulated, and driving stability can remain excellent. Moreover, ride comfort of the vehicle 1 can also remain excellent.

Further, determination of whether the vehicle is running at a relatively low or medium speed or at a high speed, and whether the vehicle is not accelerating or is accelerating, can be made based on the accelerator operation amount θ for driving and operating the vehicle 1.

For example, if the accelerator operation amount θ is less than the predetermined value E, it can be determined that the vehicle 1 is running at a relatively low or medium speed. Further, if the change rate of the accelerator operation amount θ is less than the predetermined value F, it can be determined that the vehicle is not accelerating. Accordingly, the smaller damping force characteristic 1 can be used. Further, in particular, when the operational speed V of the steering damper 21 is lower than the predetermined value, the smaller damping force characteristic 1 can be used. Therefore, as described above, when the accelerator operation amount θ is less than the predetermined value E, and, in addition, when the change rate of the accelerator operation amount θ is less than the predetermined value F, if the operational speed V of the steering damper 21 is lower than the predetermined value, then the steering damper 21 can set to the damping force characteristic 1 to decrease the damping force.

Further, even when the accelerator operation amount θ is less than the predetermined value E, and when the change rate of the accelerator operation amount θ is less than the predetermined value F, the vehicle can still be running at a relatively high speed. However, when the accelerator operation amount θ becomes less than the predetermined value E, and when the change rate of the accelerator operation amount θ becomes less than the predetermined value F, it can then be determined that the vehicle is going to be running at a relatively low or medium speed in the near future. In anticipation of this, the steering damper 21 can be set to the damping force characteristic 1 to decrease the damping force.

Therefore, the steering operation A of the steering member 7 performed by a rider while the vehicle is relatively running at a low or medium speed and not accelerating, and the steering operation A during handling performed while the vehicle is running at a low speed and is not accelerating, can be prevented from being regulated intensely by the damping force at an earlier stage. Consequently, as the steering operation and handling at a time when the vehicle 1 is running at a relatively low or medium speed and not accelerating can be performed lightly and smoothly at an earlier stage, ride comfort of the vehicle 1 can remain excellent.

Further, although it can be determined that the vehicle is going to be running at a relatively low or medium speed in the near future, when the operational speed V of the steering damper 21 is equal to or higher than the predetermined value, or in other words, when the steering operation A of the steering member 7 cooperating with the steering damper 21 is relatively fast, it can be determined that large impact force can be applied to the steering member 7 from the road surface. Accordingly, as described above, the steering damper 21 can be set to the damping force characteristic 2 to increase the damping force.

Therefore, the impact force applied to the steering member 7 from the road surface can be efficiently damped, and driving stability can remain excellent.

On the other hand, if the accelerator operation amount θ becomes equal to or larger than the predetermined value E, or if the change rate of the accelerator operation amount θ becomes equal to or larger than the predetermined value F, it can be determined that the vehicle 1 is running at a relatively higher speed or is going to be running at a relatively higher speed in the future. In anticipation of this, the steering damper 21 can be set to the damping force characteristic 2 to increase the damping force.

Therefore, even when the steering operation A of the steering member 7 starts to become faster because of the impact force from the road surface, the steering operation can be regulated at an earlier stage by the larger damping force. Consequently, the steering operation A can be regulated to become slower at an earlier stage. As a result, driving stability of the vehicle 1 can remain excellent.

The description above is based on the example shown in the drawings. However, the vehicle 1 can have three wheels or four wheels and may be of a type which runs with electric power. Further, two or more bypass oil passages 34 and control valves 45 can be provided. Further, the opening of the control valve 45 can be arbitrarily adjustable.

Figure 7:
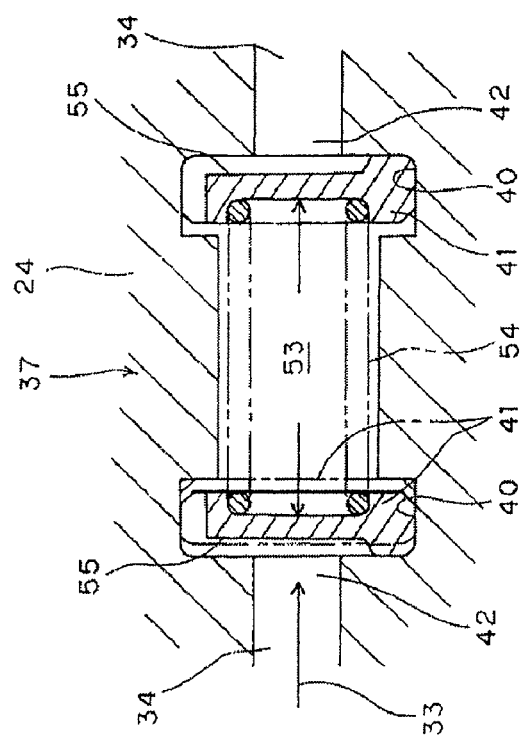
FIG. 7 is a cross-sectional view of a portion of an alternative embodiment of a steering damping device.

With reference to FIG. 7, a second embodiment of the steering damper device can be common to the embodiment shown in FIGS. 1-6 in many respects. Common reference numerals and symbols are given to the drawing, and repeated descriptions are omitted concerning things in common while different aspects are described below.

The first damping force generator 37 of the second embodiment can include a pair of the large diameter chambers 40, 40 formed to sandwich a part 53 of the bypass oil passage 34, a pair of the discoid movable bodies 41, 41 axially movably contained in each of the large diameter chambers 40, and a spring 54 biasing the movable bodies 41, 41 to separate from each other.

The movable body 41 can be pressed on one end surface of the large diameter chamber 40 by the spring 54. A connecting groove 55 connecting the bypass oil passage 34 and one part 53 can be formed on one end surface of the movable body 41 pressed on the end surface of the large diameter chamber 40. The hydraulic oil 33 can freely flow through the bypass oil passage 34 in this state.

On the other hand, the movable body 41 can be moved against the spring 54 by the external force from the hydraulic oil 33 flowing through the bypass oil passage 34. When the other end surface of the movable body 41 comes in contact with the other end surface of the large diameter chamber 40 (indicated by an alternate long and short dash line in FIG. 7), the connecting groove 55 can close, and the flow of the hydraulic oil 33 in the bypass oil passage 34 can be regulated.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A steering damping method for a vehicle in which impact force applied to a steering member is damped by damping force, comprising:

providing a steering damper which performs an expansion operation or a contraction operation cooperatively with a steering operation of the steering member and makes hydraulic oil flow to generate a first damping force according to a first damping force characteristic and to generate a second damping force larger than the first damping force, according to a second damping force characteristic;

determining if an operational speed of the steering damper is equal to or higher than a predetermined value;

determining if the vehicle is running below a predetermined speed and is not accelerating; and generating the first damping force according to the first damping force characteristic if the operational speed of the steering damper is smaller than the predetermined value and generating the second damping force according to the second damping force characteristic if the operational speed of the steering damper is equal to or higher than the predetermined value while the vehicle is running below the predetermined speed and is not accelerating; wherein the second damping force according to the second damping force characteristic is generated by the steering damper regardless of the operational speed of the steering damper while the vehicle is running at or above the predetermined speed or is accelerating.

2. The steering damping method for a vehicle according to claim 1, wherein determining whether the vehicle is running below the predetermined speed or at or above the predetermined speed, and determining whether the vehicle is accelerating comprises determining an amount of accelerator operation for driving and operating the vehicle.

3. A steering damper device for a vehicle which performs an expansion operation or a contraction operation cooperatively with a steering operation of a steering member and makes hydraulic oil flow to generate damping force, comprising:

a bypass oil passage mutually connecting first and second oil chambers defined by a piston in a cylinder tube;

first and second damping force generators provided in series in a middle part of the bypass oil passage to regulate a flow of the hydraulic oil in the bypass oil passage; wherein the first damping force generator is arranged in the middle part of the bypass oil passage and comprises a large diameter chamber having a diameter size larger than that of the bypass oil passage and a movable body contained in the large diameter chamber to open and close the middle part of the bypass oil passage by an external force from the hydraulic oil flowing in the large diameter chamber;

the second damping force generator comprises a control valve to open or close the middle part of the bypass oil passage, a vehicle speed sensor arranged to detect a speed of the vehicle, and a vehicle acceleration sensor arranged to detect an acceleration of the vehicle;

the control valve opens the bypass oil passage when the vehicle speed sensor and the vehicle acceleration sensor detect that the vehicle is running below a predetermined speed and is not accelerating; and the control valve closes the bypass oil passage when the vehicle speed sensor and the vehicle acceleration sensor detect that the vehicle is running at or above the predetermined speed or is accelerating.

4. A steering damper device for dampening an impact force applied to a steering member of a motorcycle, comprising:

a cylindrical tube comprising first and second oil chambers and a piston, the piston separating the first oil chamber from the second oil chamber;

a bypass oil passage, the bypass oil passage fluidly connecting the first oil chamber to the second oil chamber, a portion of the bypass oil passage comprising a damping chamber larger in diameter than a diameter of the bypass oil passage on either side of the damping chamber;

a movable body within the damping chamber and configured to open and close the bypass oil passage based on hydraulic oil pressure in the damping chamber;

a control valve system configured to open and close the bypass oil passage depending upon the speed or acceleration characteristics of the vehicle, the control valve system including a vehicle speed sensor arranged to detect a speed of the vehicle, and a vehicle acceleration sensor arranged to detect an acceleration of the vehicle; wherein the control valve system is configured to open the bypass oil passage when the vehicle speed sensor and the vehicle acceleration sensor detect that the vehicle is both running at a speed less than a predetermined value and not accelerating;

the control valve system is configured to close the bypass oil passage when the vehicle speed sensor detects that the vehicle is running at a speed equal to or greater than the predetermined value; and the control valve system is configured to close the bypass oil passage when the vehicle acceleration sensor detects that the vehicle is accelerating.

\* \* \* \* \*